United States Patent
Sugiyama et al.

(10) Patent No.: US 6,981,919 B2
(45) Date of Patent: Jan. 3, 2006

(54) POWER TRAIN

(75) Inventors: Kenichi Sugiyama, Kanagawa (JP);
Toshiyuki Masuda, Kanagawa (JP);
Masao Kishi, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/294,612

(22) Filed: Nov. 15, 2002

(65) Prior Publication Data

US 2003/0096653 A1    May 22, 2003

(30) Foreign Application Priority Data

Nov. 16, 2001    (JP)    ............................. 2001-350943

(51) Int. Cl.
  *F16D 3/227*    (2006.01)
(52) U.S. Cl. ...................................... 464/146; 464/906
(58) Field of Classification Search ................ 464/146, 464/162, 167, 178, 182, 906; 180/384
See application file for complete search history.

(56) References Cited

U.S. PATENT DOCUMENTS

| 4,150,553 | A | * | 4/1979 | Aucktor | ...................... 464/178 |
| 5,230,660 | A | * | 7/1993 | Warnke | ...................... 464/146 |
| 6,068,555 | A | * | 5/2000 | Andra et al. | |
| 6,171,196 | B1 | * | 1/2001 | Welschof | ...................... 464/146 |
| 6,666,771 | B2 | * | 12/2003 | Boutin | ...................... 464/146 |
| 2003/0196846 | A1 | * | 10/2003 | Masuda et al. | |

FOREIGN PATENT DOCUMENTS

JP    2-117222 U    9/1990

* cited by examiner

*Primary Examiner*—Greg Binda
(74) *Attorney, Agent, or Firm*—Foley & Lardner LLP

(57) ABSTRACT

A power train includes a driving shaft and a follower shaft connecting to the driving shaft by way of a first joint. The follower shaft is adapted to slide relative to the driving shaft in an axial direction. The follower shaft includes: a holder shaped substantially into a cylinder, and a tubular shaft section coupled with the holder in the axial direction. The first joint includes a member defining an outer diameter. The holder holds therein the member of the first joint. The tubular shaft section coupled with the holder in the axial direction causes an inner curl to a second joint coupling the holder and the tubular shaft section. The inner curl defines an inner diameter greater than the outer diameter of the member of the first joint.

12 Claims, 5 Drawing Sheets

POWER TRAIN

BACKGROUND OF THE INVENTION

1. Field of the Invention

The present invention relates to a power train such as a propeller shaft of a vehicle. Especially, the present invention relates to a shock-absorbing construction of a constant velocity joint used for the power train of a three-joint type.

2. Description of the Related Art

Japanese Utility Model First Publication No. Heisei 2 (1990)-117222 discloses a power train applied to a propeller shaft of a vehicle.

The power train according to Japanese Utility Model First Publication No. Heisei 2 (1990)-117222 is applied to the propeller shaft of a three-joint type. The power train has a tubular shaft body separated into two, and is used for a four-wheel drive (4WD) vehicle or a rear-wheel drive vehicle.

By way of an intermediary bearing, a stub shaft connects to a first shaft which connects to a transmission. In addition, the tubular shaft body connects to the stub shaft by way of a constant velocity joint.

The tubular shaft body has a first end section constituting an outer race of the constant velocity joint. The first end section of the tubular shaft body is partly tapered. The constant velocity joint has an inner race, a cage, and a ball which are smaller in diameter than an inner diameter of the tubular shaft body. With the above construction, the inner race and the like of the constant velocity joint can enter the tubular shaft body following a backward movement of an engine and/or a transmission in a vehicular collision, to thereby absorb a shock which may be caused in the vehicular collision.

The tubular shaft body housing therein the constant velocity joint can be separated into two sections. More specifically, one is a tubular holder disposed on the first end side and constituting the outer race, and the other is a tubular shaft section disposed on a second end side opposite to the first end side. The thus separated two members, that is, the tubular holder and the tubular shaft section are coupled through a friction welding. Instead of an arc welding, the friction welding is to be used for the following reasons:

- Heat caused by the arc welding may be responsible for a thermal effect on each of members constituting the constant velocity joint that is supposed to have high dimensional accuracy.
- Contrary to the arc welding, the friction welding can cause the heat to weldment only (local heat), thus reducing the thermal effect on each of the members constituting the constant velocity joint. In addition, the friction welding can increase vibration accuracy during rotation of the propeller shaft.

Coupling the holder with the tubular shaft section through the friction welding, however, may cause an inner curl and an outer curl to the weldment. The outer curl can be deleted by cutting, thus finishing a smooth surface of the weldment. On the other hand, cutting the inner curl is of difficulty. In addition, cutting the inner curl may excessively reduce the friction welding strength. In sum, the inner curl has no choice but to remain left.

In the vehicular collision and the like, the backward movement of the engine and/or the transmission may cause the stub shaft of the propeller shaft to slide each of the members {constituting the constant velocity joint} in the tubular shaft body. Hereinabove, the members of the constant velocity joint include the ball, the inner race, and a seal plate incorporating a lubricant grease. An outer periphery of the seal plate thus slid in the tubular shaft body may abut on an edge of the inner curl, thereby preventing further sliding movement.

Prevention of the further sliding movement of the members of the constant velocity joint may be responsible for an insufficient shock-absorption, resulting in a greater shock to a seat occupant.

BRIEF SUMMARY OF THE INVENTION

It is an object of the present invention to provide a power train applicable to a three-joint type propeller shaft for a vehicle.

According to a first aspect of the present invention, there is provided a power train, comprising: I) a driving shaft; and II) a follower shaft connecting to the driving shaft by way of a first joint. The follower shaft is adapted to slide relative to the driving shaft in an axial direction.

The follower shaft comprises:
  i) a holder shaped substantially into a cylinder, the first joint comprising a member defining an outer diameter, the holder holding therein the member of the first joint, and
  ii) a tubular shaft section coupled with the holder in the axial direction, in such a manner as to cause an inner curl to a second joint coupling the holder and the tubular shaft section.

The inner curl defines an inner diameter greater than the outer diameter of the member of the first joint.

According to a second aspect of the present invention, there is provided a follower shaft connecting to a driving shaft for driving the follower shaft. The follower shaft is adapted to slide relative to the driving shaft in an axial direction. The follower shaft comprises:
  i) a holder shaped substantially into a cylinder, the holder holding therein a member of a constant velocity joint which is interposed between the follower shaft and the driving shaft, the member defining an outer diameter, the holder having an inner end section and an outer end section, the inner end section being formed with a first inner curl, and
  ii) a tubular shaft section coupled with the holder in the axial direction, in such a manner as to cause a second inner curl abutting on the first inner curl thus forming a weldment joint.

The first inner curl and the second inner curl disposed at the weldment joint define an inner diameter which is greater than the outer diameter of the member of the constant velocity joint.

The other objects and features of the present invention will become understood from the following description with reference to the accompanying drawings.

DETAILED DESCRIPTION OF THE EMBODIMENT

In the following, an embodiment of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

A power train under the present invention is applicable to a three-joint type propeller shaft for a vehicle.

Figure 1:
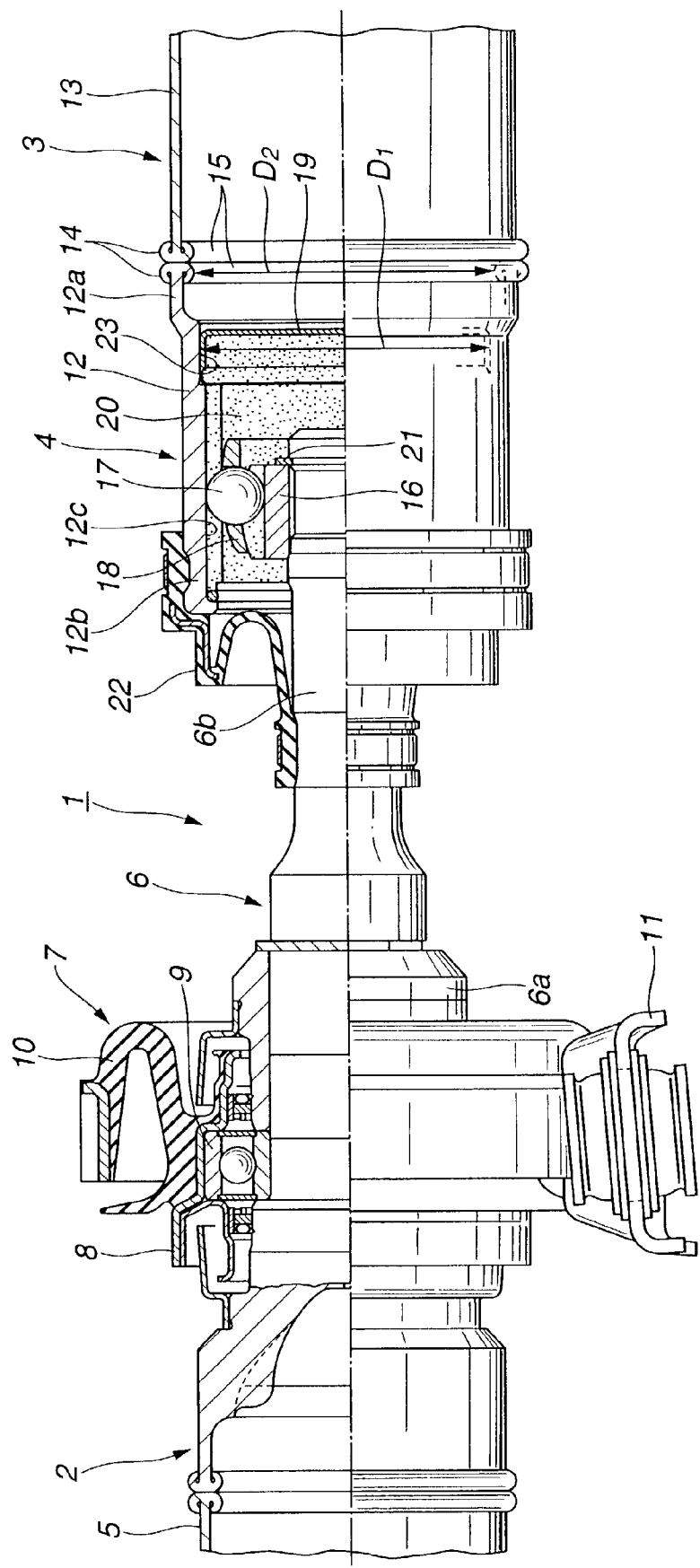
FIG. 1 shows a longitudinal cross section of an essential part of a propeller shaft 1, according to an embodiment of the present invention.

As is seen in FIG. 1, there is provided a propeller shaft 1, according to an embodiment of the present invention.

The propeller shaft 1 is mainly constituted of a steel pipe shaft 2 and a follower shaft 3. The steel pipe shaft 2 acts as a driving shaft connecting to a transmission. The follower shaft 3 axially connects to the steel pipe shaft 2 by way of a constant velocity joint 4 (first joint).

The steel pipe shaft 2 is constituted of a tubular body 5 and a stub shaft 6. The tubular body 5 is disposed on the transmission's side of the steel pipe shaft 2. The stub shaft 6 integrally couples to a first end (right in FIG. 1) of the tubular body 5 through a friction welding, thus forming a third joint (a second joint is to be described afterward). The stub shaft 6 is solid and smaller in diameter than the tubular body 5. The stub shaft 6 has an intermediary diameter section 6a which is rotatably supported to a vehicular body (not shown in FIG. 1) by means of an intermediary bearing 7. Moreover, the stub shaft 6 has a small diameter section 6b which is disposed on a head side (right in FIG. 1) of the stub shaft 6 and is inserted in the follower shaft 3, thus constituting part of the constant velocity joint 4.

The intermediary bearing 7 has a ball bearing 9 which is cased with a casing 8 disposed on an outer periphery of the intermediary diameter section 6a. The intermediary bearing 7 is mounted to the vehicular body (not shown in FIG. 1) by way of a rubber bush 10 and a bracket 11. The rubber bush 10 can isolate vibration and is disposed on an outer periphery of the casing 8, while the bracket 11 is mounted to a lower end of the casing 8.

The follower shaft 3 is constituted of a cylindrical holder 12 and a tubular shaft section 13. The holder 12 constitutes an outer race of the constant velocity joint 4. The tubular shaft 13 axially couples to the holder 12 through the friction welding, thus forming a second joint. An outer curl 14 and an inner curl 15 caused during the friction welding remain on the second joint which is defined between the holder 12 and the tubular shaft section 13.

The holder 12 has an inner end section 12a (right in FIG. 1) which is disposed on the tubular shaft section 13's side, and stepped greater in diameter than the other section of the holder 12. Moreover, the inner end section 12a is thinner than the other section of the holder 12.

On the other hand, the tubular shaft section 13 has an outer diameter which is substantially the same as an outer diameter of the inner end section 12a of the holder 12. The tubular shaft section 13 is as thin as the inner end section 12a of the holder 12. Even the thinness of the tubular shaft section 13 and the inner end section 12a can secure sufficient space for the friction welding.

Between an outer end section 12b (of the holder 12) and the small diameter section 6b (of the stub shaft 6), there is provided a rubber boot 22 for preventing entry of dust, particles and the like into the holder 12.

The constant velocity joint 4 is mainly constituted of the outer race (which is constituted of the holder 12), an annular inner race 16, a plurality of balls 17, a cage 18, and a seal plate 19. The inner race 16 is disposed on an outer periphery of the small diameter section 6b of the stub shaft 6. The balls 17 can rotatably move between the inner race 16 and the holder 12. The cage 18 can cage therein each of the balls 17. The seal plate 19 is disposed in the inner end section 12a of the holder 12, for sealing a lubricant grease 20 contained in the holder 12. A snap ring 21 for controlling an axial movement of the inner race 16 is snap-fitted to a head end (right in FIG. 1) of the small diameter section 6b.

The seal plate 19 is press-fitted in an inner periphery of a step groove wall 23 which is annular in shape and formed in the inner end section 12a of the holder 12. The seal plate 19 has an outer diameter D1 which is smaller than an inner diameter D2 of the inner curl 15. Moreover, each of the balls 17 caged in the cage 18 has an outer periphery which is rotatably held by a groove wall 12c formed axially on an inner periphery of the holder 12. The groove wall 12c has an inner diameter which is smaller than an inner diameter of the step groove wall 23. The outer periphery of each of the balls 17 can be disposed inside the inner periphery of the groove wall 12c. With the above construction, the outer diameter of each of the members (namely, the small diameter section 6b, the inner race 16, the ball 17, the cage 18, and the seal plate 19) constituting the constant velocity joint 4 can be smaller than the inner diameter D2 of the inner curl 15.

Hereinafter described referring to FIG. 2 to FIG. 5 is operation of the power train, according to the embodiment of the present invention.

Figure 2:
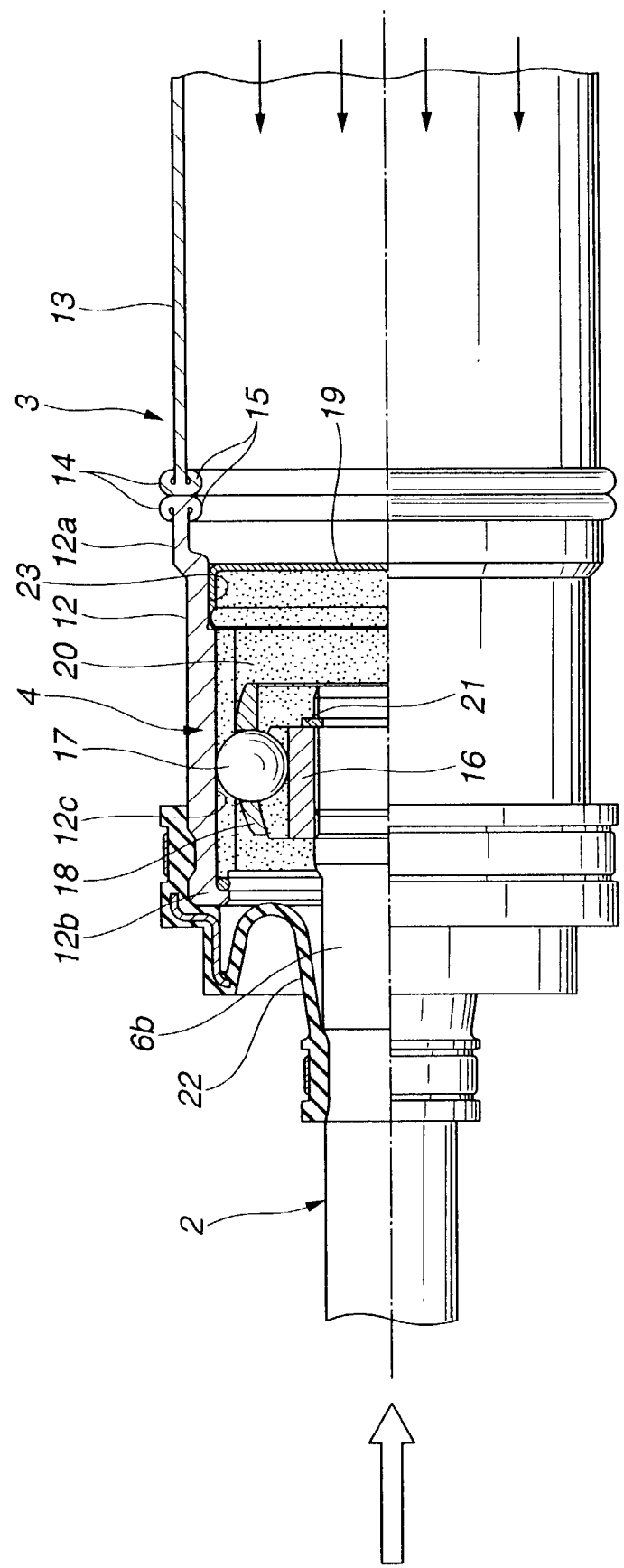
FIG. 2 shows the longitudinal cross section of the essential part of the propeller shaft 1 in a vehicular collision.

In case of a vehicular collision and the like, a great shock (indicated by a leftward void arrow) is, as is seen in FIG. 2, axially applied from the transmission's side to the steel pipe shaft 2 connecting to the follower shaft 3 by way of the constant velocity joint 4. The thus applied great shock may be responsible for a reaction of the follower shaft 3 as is indicated by opposing arrows (leftward in FIG. 2), thus causing a sliding movement of the constant velocity joint 4 together with the steel pipe shaft 2 from inside of the holder 12 toward inside of the tubular shaft section 13.

Figure 3:
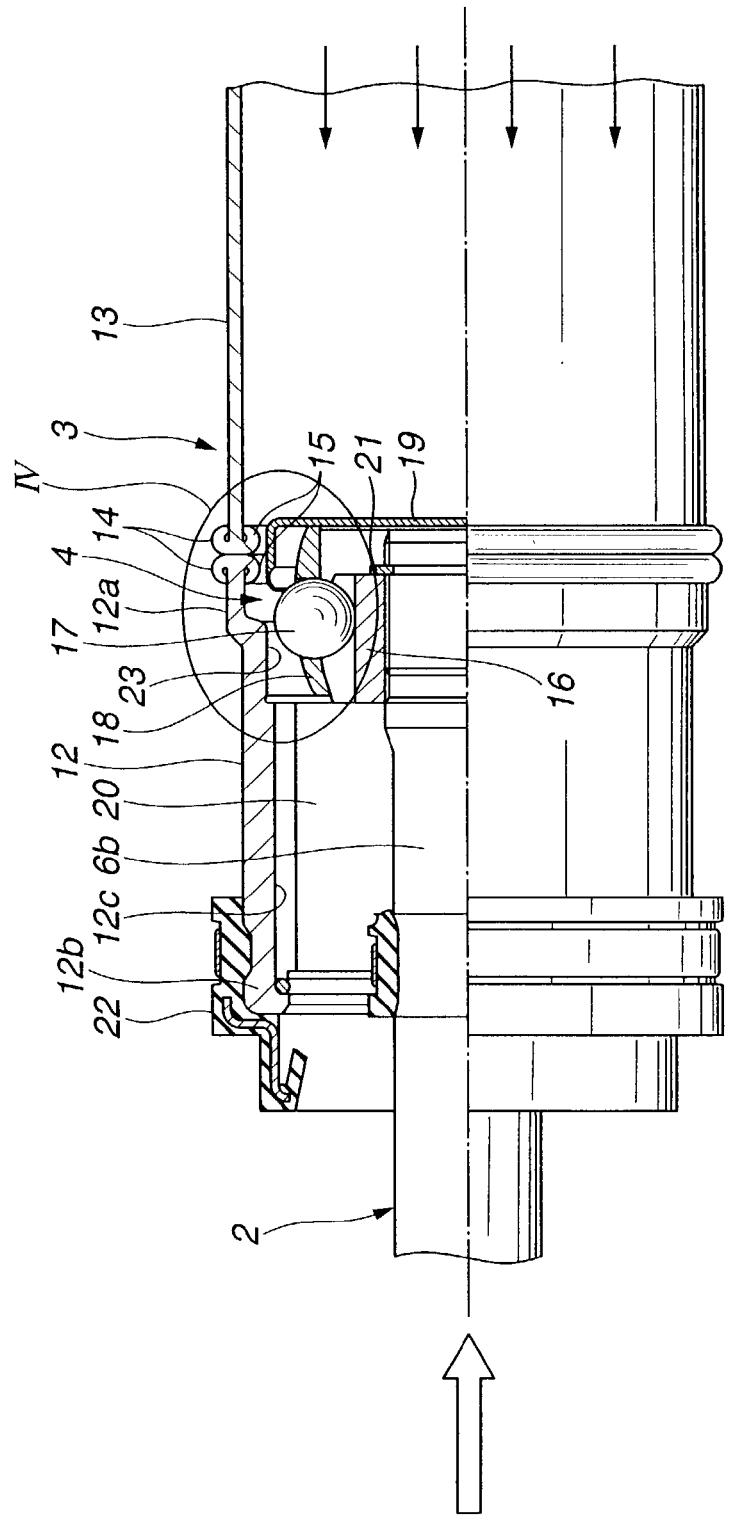
FIG. 3 shows an operation of the longitudinal cross section of the essential part of the propeller shaft 1 in the vehicular collision.
Figure 4:
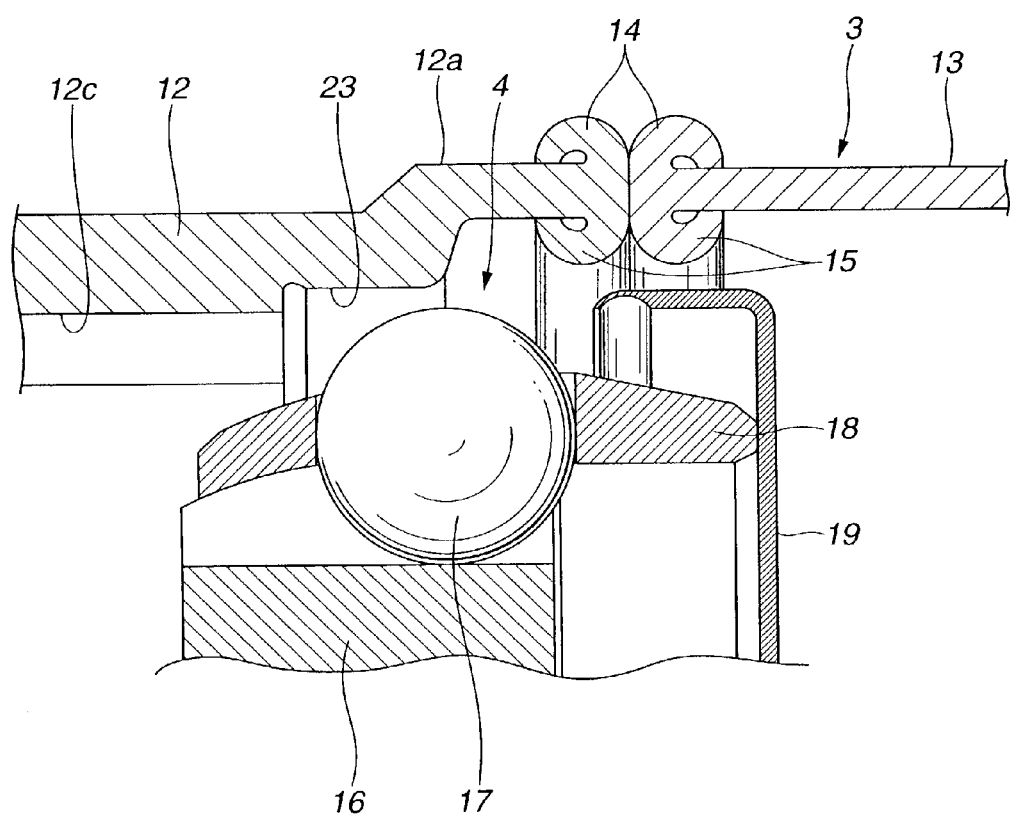
FIG. 4 is an enlarged view of a section IV in FIG. 3.
Figure 5:
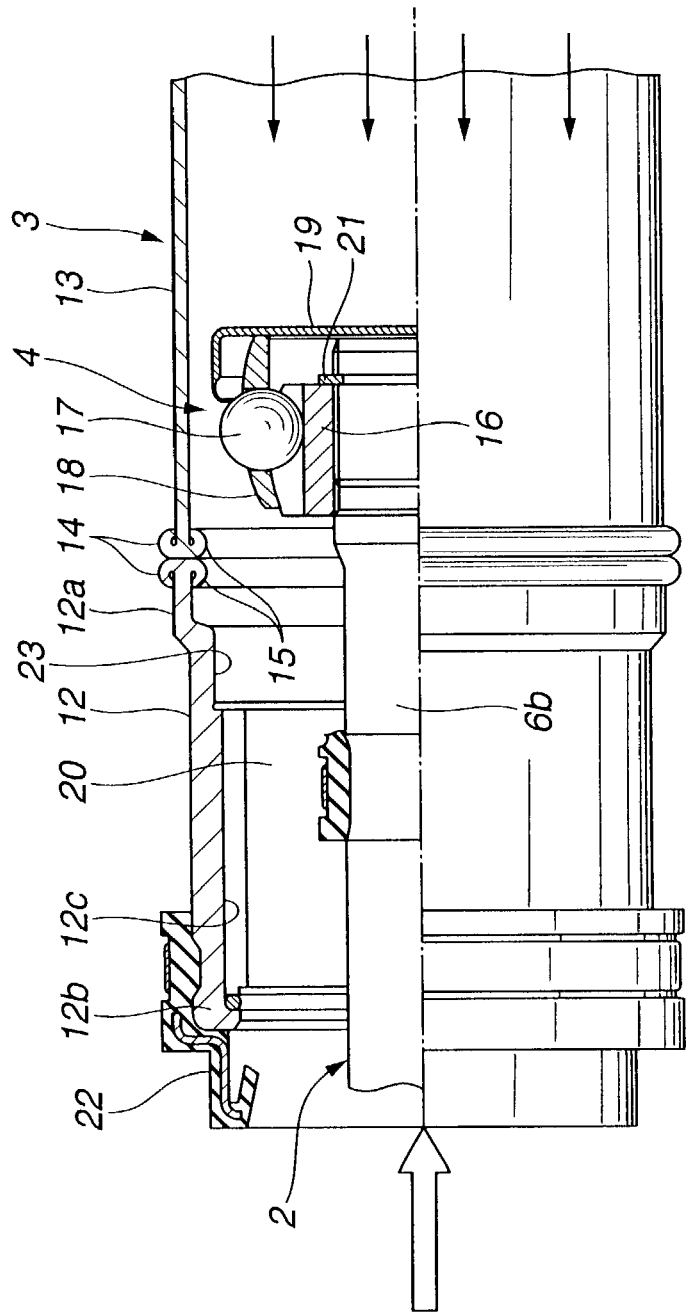
FIG. 5 shows the operation of the longitudinal cross section of the essential part of the propeller shaft 1 in the vehicular collision, following the operation in FIG. 3.

Thereafter, when the constant velocity joint 4 slidably moves to such an extent as to reach the inner curl 15 as is seen in FIG. 3 and FIG. 4, the rubber boot 22 (FIG. 3) may be stretched and broken. In addition, each of the members (namely, the small diameter section 6b, the inner race 16, the ball 17, the cage 18, and the seal plate 19) constituting the constant velocity joint 4 can pass through the inner curl 15 without abutting on an inner wall of the inner curl 15. Then, a first end (right in FIG. 3 and FIG. 4) of the cage 18 can abut on the seal plate 19. Thereby, the seal plate 19 can be pulled out from the step groove wall 23, resulting in a primary absorption of the great shock, and allowing further sliding movement of the constant velocity joint 4 inward the follower shaft 3 as is seen in FIG. 5.

Hereinabove, it is the first end of the cage 18 that abuts on the seal plate 19. A first end (right in FIG. 3 and FIG. 5) of the small diameter section 6b of the stub shaft 6 can replace the seal plate 19, for causing the same operation caused by the seal plate 19.

The thus elongated sliding movement of the constant velocity joint 4 together with the steel pipe shaft 2 can further absorb the great shock (secondary absorption) attributable to the vehicular collision.

In sum, the power train according to the embodiment of the present invention can prevent thermal effect (attributable to the friction welding of the holder 12 and the tubular shaft section 13) which may be caused to each of the members (namely, the small diameter section 6b, the inner race 16, the ball 17, the cage 18, and the seal plate 19) constituting the constant velocity joint 4. In addition, the power train according to the embodiment of the present invention can bring about sufficient absorption of the shock caused by the vehicular collision.

The second joint defined between the holder 12 and the tubular shaft section 13 has an inner diameter which is greater than the inner diameter of the groove wall 12c of the outer race (holder 12), thus securing sufficient space for the friction welding and leading to high welding strength.

Although the present invention has been described above by reference to a certain embodiment, the present invention is not limited to the embodiment described above. Modifications and variations of the embodiment described above will occur to those skilled in the art, in light of the above teachings.

More specifically, the power train according to the embodiment of the present invention can be applied to a member other than the propeller shaft 1 as described above. In addition, the constant velocity joint 4 can be of a tripod type.

The entire contents of basic Japanese Patent Application No. P2001-350943 (filed on Nov. 16, 2001 in Japan) from which priority is claimed is incorporated herein by reference, in order to take some protection against mis-translation or omitted portions.

The scope of the present invention is defined with reference to the following claims.

What is claimed is:

1. A power train comprising:
    (1) a driving shaft;
    (2) an inner structure including balls forming a first joint; and
    (3) a follower shaft connecting to the driving shaft by way of the first joint, the follower shaft being adapted to slide relative to the driving shaft in an axial direction, the follower shaft comprising:
        (a) a cylindrical holder, the holder holding therein the inner structure of the first joint, and
        (b) a tubular shaft section coupled with the holder in the axial direction in such a manner as to cause an inner curl to a second joint coupling the holder and the tubular shaft section, the inner curl defining an inner diameter greater than an outer diameter of the inner structure of the first joint received in the cylindrical holder,
    wherein the tubular shaft section is coupled with the holder in the axial direction by a friction welding,
    wherein the first joint is a constant velocity joint, and
    wherein the tubular shaft section has an inside cavity sized to accommodate the inner structure of the first joint when moved axially out of the cylindrical holder, through the second joint, into the tubular shaft section.

2. The power train as claimed in claim 1,
    wherein the holder constitutes an outer race of the constant velocity joint, wherein the outer race has
    an inner end section disposed on the friction welding's side of the outer race, and
    an outer end section disposed on an opposite side to the friction welding's side of the outer race, the inner end section being greater in inner diameter than the outer end section, and
    wherein the tubular shaft section has an inner diameter which is substantially equivalent to an inner diameter of the inner end section of the outer race.

3. The power train as claimed in claim 2,
    wherein the driving shaft comprises a tubular body and a stub shaft integrally coupled with each other at a third joint through a friction welding, the tubular body being disposed on a transmission's side of the driving shaft, opposite to the follower shaft's side of the driving shaft, and
    wherein the stub shaft includes:
    an intermediary diameter section which is rotatably supported to a vehicular body by means of an intermediary bearing, and
    a small diameter section which is disposed on the follower shaft's side of the driving shaft and is inserted in the follower shaft, thus constituting a part of the constant velocity joint.

4. The power train as claimed in claim 3,
    wherein the inner end section of the holder is thinner than a remaining section of the holder,
    wherein the tubular shaft section has an outer diameter which is substantially equivalent to an outer diameter of the inner end section of the holder, and
    wherein the tubular shaft section is as thin as the inner end section of the holder.

5. The power train as claimed in claim 1, wherein the power train is a propeller shaft, and wherein the driving shaft is a steel pipe shaft.

6. A power train comprising:
    (1) a driving shaft;
    (2) an inner structure forming a first joint; and
    (3) a follower shaft connecting to the driving shaft by way of the first joint, the follower shaft being adapted to slide relative to the driving shaft in an axial direction, the follower shaft comprising:
        (a) a cylindrical holder, the holder holding therein the inner structure of the first joint, and
        (b) a tubular shaft section coupled with the holder in the axial direction in such a manner as to form a second joint coupling the holder and the tubular shaft section, the second joint including an inner curl defining an inner diameter greater than an outer diameter of the inner structure of the first joint received in the cylindrical holder,
    wherein the tubular shaft section is coupled with the holder in the axial direction by a friction welding,
    wherein the first joint is a constant velocity joint,
    wherein the holder constitutes an outer race of the constant velocity joint, wherein the outer race has:
        an inner end section disposed on the friction welding's side of the outer race, and
        an outer end section disposed on an opposite side to the friction welding's side of the outer race, the inner end section being greater in inner diameter than the outer end section, and
    wherein the tubular shaft section has an inner diameter which is substantially equivalent to an inner diameter of the inner end section of the outer race, wherein the driving shaft comprises a tubular body and a stub shaft integrally coupled with each other at a third joint through a friction welding, the tubular body being disposed on a transmission's side of the driving shaft, opposite to the follower shaft's side of the driving shaft,
wherein the stub shaft includes:
an intermediary diameter section which is rotatably supported to a vehicular body by means of an intermediary bearing, and
a small diameter section which is disposed on the follower shaft's side of the driving shaft and is inserted in the follower shaft, thus constituting a part of the constant velocity joint wherein the inner end section of the holder is thinner than a remaining section of the holder,
wherein the tubular shaft section has an outer diameter which is substantially equivalent to an outer diameter of the inner end section of the holder,
wherein the tubular shaft section is as thin as the inner end section of the holder,
wherein a rubber boot for preventing an entry of a dust and a particle into the holder is disposed between the outer end section of the holder, and the small diameter section of the stub shaft,
wherein the inner structure of the constant velocity joint includes a cage, an inner race and balls confined in the cage between the inner race and the holder, and
wherein the power train further includes the constant velocity joint which further includes a seal plate disposed axially between the cage and the second joint, and held by the holder to seal the constant velocity joint and to absorb impact energy when the inner structure of the constant velocity joint is pushed axially toward the second joint.

7. The power train as claimed in claim 6,
wherein the inner race is disposed on an outer periphery of the small diameter section of the stub shaft,
wherein the balls rotatably move between the inner race and the holder,
wherein the seal plate is disposed in the inner end section of the holder, for sealing a lubricant grease contained in the holder, and
wherein a snap ring for controlling an axial movement of the inner race is snap-fitted to a head end of the small diameter section.

8. The power train as claimed in claim 7,
wherein the seal plate is press-fitted in an inner periphery of a step groove wall which is annular in shape and formed in the inner end section of the holder,
wherein the seal plate has an outer diameter which is smaller than the inner diameter of the inner curl,
wherein each of the caged balls is rotatably held by a groove wall formed axially on an inner periphery of the holder,
wherein the groove wall has an inner diameter which is smaller than an inner diameter of the step groove wall, and the balls are disposed inside an imaginary cylinder defined by the inner periphery of the groove wall,
wherein the outer diameter of the inner structure of the first joint is defined by at least one of the inner race, the balls, the cage, and
wherein the outer diameter of the inner structure of the first joint is smaller than the inner diameter of the inner curl, and an outer diameter of the seal plate of the first joint is smaller than the inner diameter of the inner curl.

9. A power train comprising:
(1) a driving shaft;
(2) an inner structure of a first joint comprising:
(a) an inner race;
(b) a set of balls; and
(c) a cage; and
(3) a follower shaft connecting to the driving shaft by way of the first joint, wherein the follower shaft is adapted to slide relative to the driving shaft in an axial direction, the follower shaft comprising:
(a) a cylindrical holder, the holder holding therein the inner structure of the first joint and serving as an outer race of the first joint; and
(b) a tubular shaft section coupled with the holder in the axial direction, in such a manner as to form a second joint coupling the holder and the tubular shaft section, the second joint including an inner curl defining an inner diameter greater than an outer diameter of any of the inner race, the set of balls, the cage and the seal plate of the first joint, the cylindrical holder, the second joint and the tubular shaft section being arranged to allow movement of a whole of the inner structure of the first joint axially out of the cylinder holder through the second joint into the tubular shaft section.

10. A propeller shaft comprising:
(1) a driving shaft;
(2) an inner structure including rolling elements constituting a constant velocity joint;
(3) a follower shaft connected drivingly with the driving shaft by the constant velocity joint, the follower shaft comprising:
(a) a cylindrical tubular shaft section; and
(b) a cylindrical holder including:
(i) a first section enclosing the inner structure of the constant velocity joint, and
(ii) a second section which is joined end to end with the tubular shaft section by friction welding, and which is enlarged so as to allow passage of the inner structure of the constant velocity joint axially through a joint portion formed by the friction welding between the second section and the tubular shaft section;
wherein the cylindrical tubular shaft section is shaped to receive the inner structure of the constant velocity joint when the inner structure is moved axially through the joint portion formed by the friction welding,
wherein the inner structure of the constant velocity joint includes a cage for caging the rolling elements received in the first section of the holder, and
wherein the tubular shaft section includes a cylindrical inside surface having an axial length greater than an axial length of the cage.

11. A propeller shaft comprising:
(1) a driving shaft;
(2) an inner structure including rolling elements constituting a constant velocity joint;
(3) a follower shaft connected drivingly with the driving shaft by the constant velocity joint, the follower shaft comprising:
(a) a cylindrical tubular shaft section; and
(b) a cylindrical holder including:
(i) a first section enclosing the inner structure of the constant velocity joint, and
(ii) a second section which is joined end to end with the tubular shaft section by friction welding, and which is enlarged so as to allow passage of the inner structure of the constant velocity joint axially through a joint portion formed by the friction welding between the second section and the tubular shaft section;

wherein the cylindrical tubular shaft section is shaped to receive the inner structure of the constant velocity joint when the inner structure is moved axially through the joint portion formed by the friction welding, and wherein the cylindrical holder and the tubular shaft section of the follower shaft are shaped so as to allow a whole of the inner structure of the constant velocity joint to be forced into the tubular shaft section through the joint portion formed by the friction welding when an axial force is applied to the driving shaft in an axial direction toward the follower shaft in case of a collision of a vehicle in which the propeller shaft is to be installed.

12. A propeller shaft comprising:
(1) a driving shaft;
(2) an inner structure including rolling elements constituting a constant velocity joint;
(3) a follower shaft connected drivingly with the driving shaft by the constant velocity joint, the follower shaft comprising:
  (a) a cylindrical tubular shaft section; and
  (b) a cylindrical holder including:
    (i) a first section enclosing the inner structure of the constant velocity joint, and
    (ii) a second section which is joined end to end with the tubular shaft section by friction welding, and which is enlarged so as to allow passage of the inner structure of the constant velocity joint axially through a joint portion formed by the friction welding between the second section and the tubular shaft section;

wherein the cylindrical tubular shaft section is shaped to receive the inner structure of the constant velocity joint when the inner structure is moved axially through the joint portion formed by the friction welding;

wherein the propeller shaft further comprises a seal plate to seal the constant velocity joint;

wherein the cylindrical holder includes a third section in which the seal plate is fit;

wherein the third section of the cylindrical holder is formed axially between the first section and the second section of the cylindrical holder; and wherein the third section of the cylindrical holder has an inside cylindrical surface which is smaller in cross sectional size than an inside cylindrical surface of the second section, and an annular step shoulder surface which is formed between the first section and the third section and which faces axially toward the tubular shaft section.

* * * * *